(12) United States Patent
Kogure

(10) Patent No.: US 7,234,339 B2
(45) Date of Patent: Jun. 26, 2007

(54) ROAD SURFACE FRICTIONAL COEFFICIENT ESTIMATING APPARATUS

(75) Inventor: Masaru Kogure, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 158 days.

(21) Appl. No.: 10/923,941

(22) Filed: Aug. 24, 2004

(65) Prior Publication Data

US 2005/0049774 A1    Mar. 3, 2005

(30) Foreign Application Priority Data

Aug. 26, 2003    (JP) .............................. 2003-301999

(51) Int. Cl.
   *G01N 19/02*    (2006.01)
(52) U.S. Cl. .............................. 73/9; 701/80
(58) Field of Classification Search ................ 701/80; 73/7, 9
   See application file for complete search history.

(56) References Cited

U.S. PATENT DOCUMENTS

| 5,229,955 | A | * | 7/1993 | Nishiwaki et al. ............ 701/80 |
| 5,351,192 | A | | 9/1994 | Tsuyama et al. |
| 6,276,189 | B1 | * | 8/2001 | Hurson ............................. 73/9 |
| 6,418,369 | B2 | * | 7/2002 | Matsumoto et al. .......... 701/80 |
| 6,577,941 | B2 | * | 6/2003 | Kawasaki et al. ............ 701/70 |
| 6,577,943 | B2 | * | 6/2003 | Nakao et al. ................. 701/80 |
| 2001/0033106 | A1 | * | 10/2001 | Shirai et al. ................ 303/177 |
| 2002/0007661 | A1 | * | 1/2002 | Takahashi ........................ 73/9 |
| 2002/0072841 | A1 | * | 6/2002 | Kogure .......................... 701/80 |
| 2002/0124629 | A1 | * | 9/2002 | Hurson ............................. 73/9 |
| 2003/0078717 | A1 | * | 4/2003 | Kawasaki et al. ............ 701/80 |
| 2004/0204812 | A1 | * | 10/2004 | Tran ............................. 701/80 |

FOREIGN PATENT DOCUMENTS

| EP | 1 157 909 A2 | 11/2001 |
| EP | 1 201 521 A1 | 5/2002 |
| EP | 1 302 378 A2 | 4/2003 |
| FR | 2 748 239 A | 11/1997 |
| JP | 2001-39289 | 2/2001 |

OTHER PUBLICATIONS

European Search Report dated Oct. 4, 2005.

* cited by examiner

*Primary Examiner*—Hezron Williams
*Assistant Examiner*—Ryan Christensen
(74) *Attorney, Agent, or Firm*—McGinn IP Law Group, PLLC

(57) ABSTRACT

A braking/driving force fx is calculated at S102, and a lateral force Fy is calculated at S103. At S104, reference is made to a preset map to select a road surface μ estimation part to be used for determination (to select a first road surface μ estimation part 25 or a second road surface μ estimation part 26 or nonperformance of determination. At S105, a display flag Fla from the road surface μ selection part is read. Indication 1 is displayed (S107) in the case of a road having a high μ. Indication 2 is displayed (S109) in the case of a road having a medium μ. Indication 3 is displayed (S111) in the case of a road having a low μ. Indication 0 is displayed (S112) in other cases wherein the road surface μ is unknown.

5 Claims, 12 Drawing Sheets

FIG. 13A  INDICATION 0
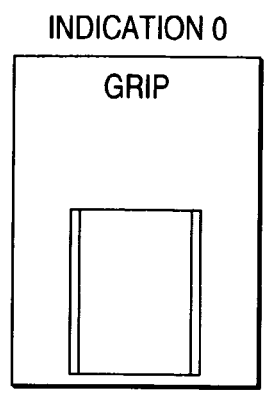
FIG. 13B  INDICATION 1
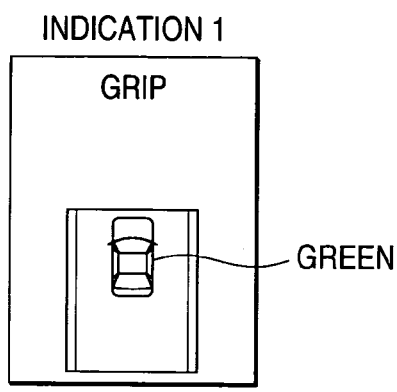
FIG. 13C  INDICATION 2
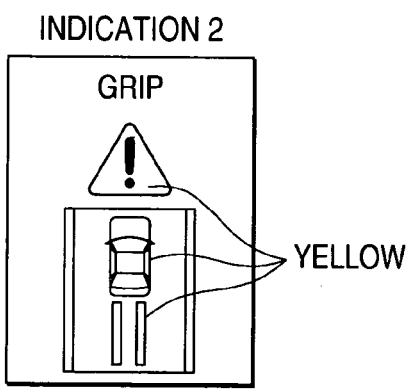
FIG. 13D  INDICATION 3
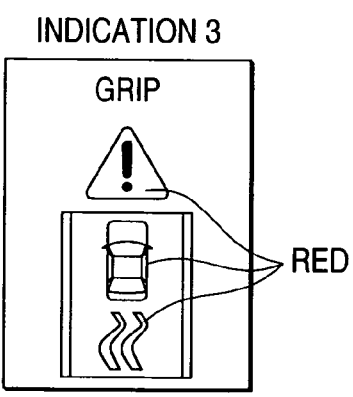

NAVIGATION SCREEN

POP-UP INDICATION

POP-UP INDICATION 2

— YELLOW

POP-UP INDICATION 3

— RED

ROAD SURFACE FRICTIONAL COEFFICIENT ESTIMATING APPARATUS

BACKGROUND OF THE INVENTION

The present invention relates to a road surface frictional coefficient estimating apparatus for a vehicle which, in particular, shows an estimated road surface frictional coefficient (hereinafter referred to as "road surface μ") to a driver to assist driving.

Recently, various control techniques for vehicles, such as traction control, braking force control, and torque distribution control, have been proposed and put in practical use. Most of those techniques employ a road surface μ for the calculation or correction of required control parameters, and it is required to estimate the road surface μ in order to execute such control with reliability.

Referring to the estimation of a road surface μ, various techniques have been proposed, in which a road surface μ is estimated based on vehicle motion parameters such as lateral acceleration and a yaw rate. For example, in JP-A-2001-039289, the present applicant has proposed a technique for estimating a road surface μ by comparing an actual yaw rate estimated by an observer with a yaw rate on the basis of a high-μ road calculated using a model of vehicle motion on a high-μ road and a yaw rate on the basis of a low-μ road calculated using a model of vehicle motion on a low-μ road.

SUMMARY OF THE INVENTION

A road surface μ as estimated according to JP-A-2001-039289 can be used not only for various control techniques as described above but also as a significant guideline for driving by a driver when such information is effectively supplied to the driver. For example, when such information is supplied to a driver who is traveling especially on a road having a low μ, the driver can choose to refrain from driving at a high speed, braking or accelerating hard, or turning the steering handle sharply, which is very much preferable for stable driving.

The invention has been made taking the above-described situation into consideration, and it is an object of the invention to provide a road surface frictional coefficient estimating apparatus for a vehicle which not only allows an estimated road surface μ to be used for control over behaviors of a vehicle but also effectively notifies the driver of the road surface μ to provide a preferable driving aid for the driver.

In order to resolve the object, the invention provides a road surface frictional coefficient estimating apparatus for a vehicle, comprising road surface frictional coefficient estimation means for estimating the frictional coefficient of the road surface, and display means that varies the mode of display depending on the estimated road surface coefficient.

A road surface frictional coefficient estimating apparatus according to the invention not only allows an estimated road surface μ to be used for control over behaviors of a vehicle but also effectively notifies the driver of the road surface μ to provide a preferable driving aid for the driver.

BRIEF DESCRIPTION OF THE DRAWINGS

FIGS. 13A to 13D illustrate road surface μ conditions displayed on a screen.

Figure 1:
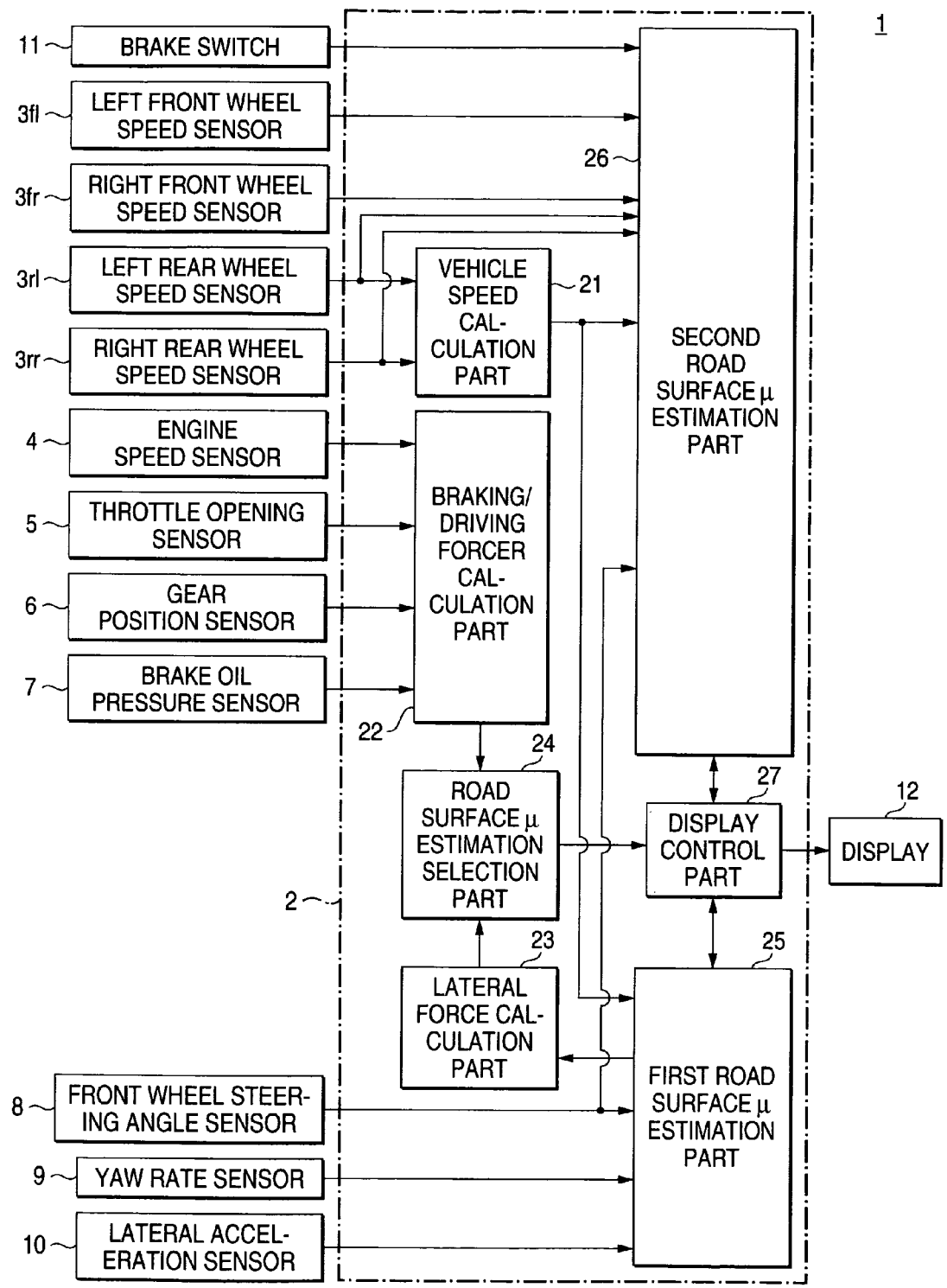
FIG. 1 schematically illustrates a road surface frictional coefficient estimating apparatus for a vehicle as a whole.

Note, in the drawings, reference numeral 1 is a road surface frictional coefficient estimation apparatus, reference numeral 2 is a main control unit, reference numeral 12 is a display (display means), reference numeral 22 is a braking/driving force calculation part (selection means), reference numeral 23 is a lateral force calculation part (selection means), reference numeral 24 is a road surface μ estimation selection part (selection means), reference numeral 25 is a first road surface μ estimation part (road surface frictional coefficient estimation means), reference numeral 26 is a second road surface μ estimation part (road surface frictional coefficient estimation means), reference numeral 27 is a display control part (display means).

DESCRIPTION OF THE PREFERRED EMBODIMENT

An embodiment of the invention will now be described based on the drawings.

Figure 2:
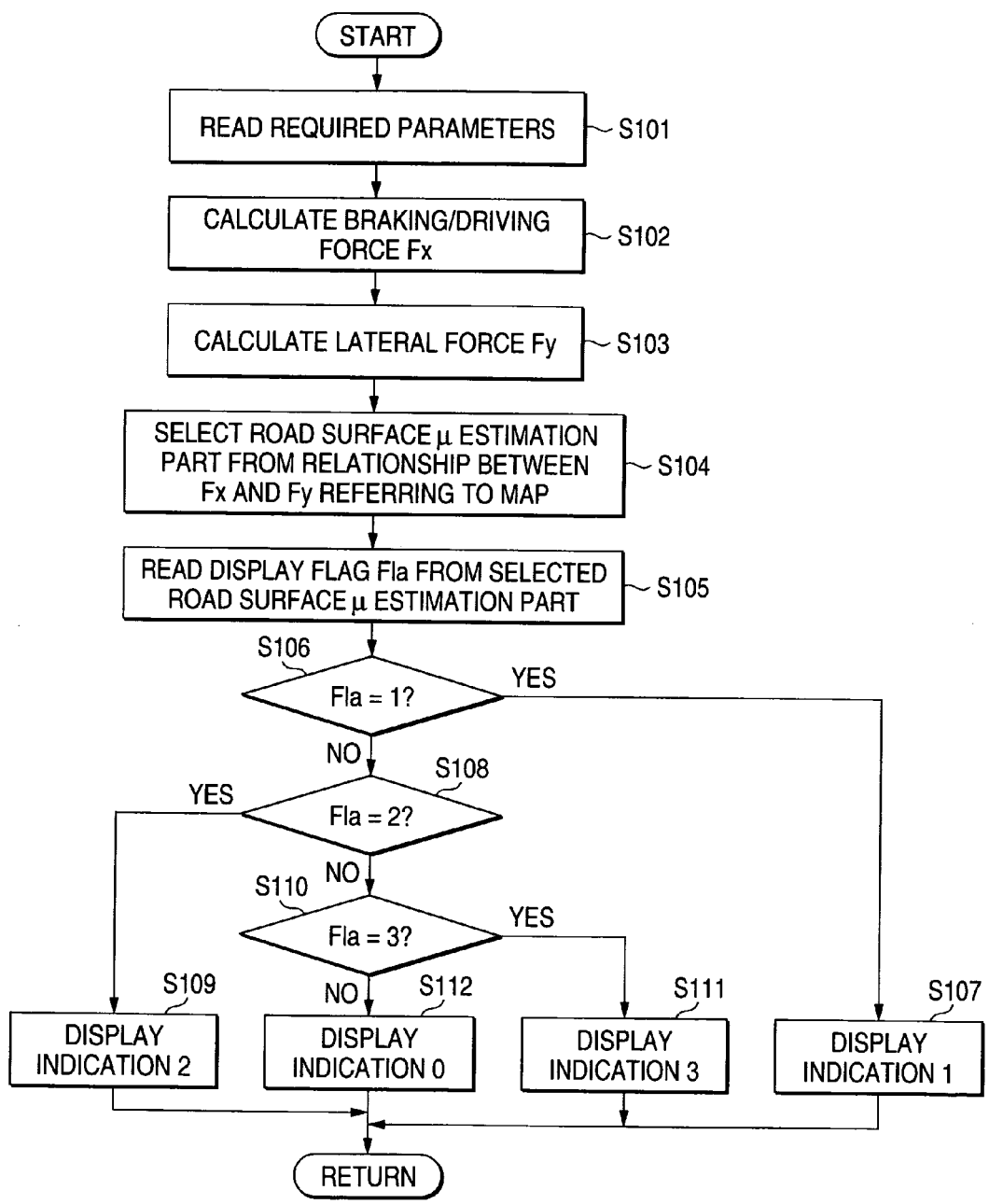
FIG. 2 is a flow chart of a road surface frictional coefficient display program.
Figure 3:
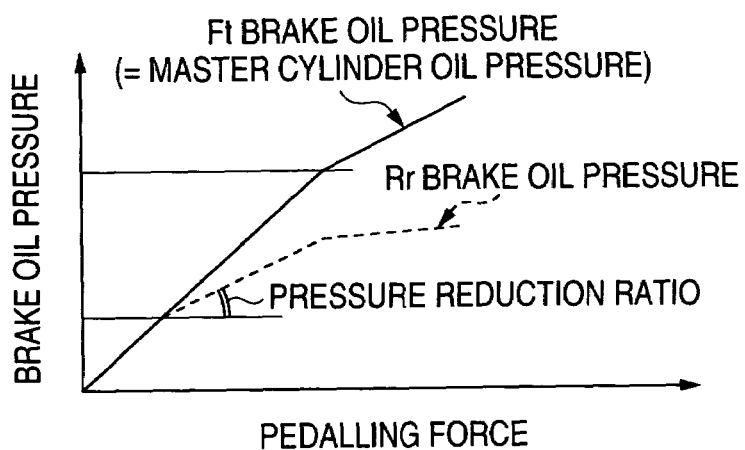
FIG. 3 illustrates a relationship between a pedaling force and a brake oil pressure.
Figure 4:
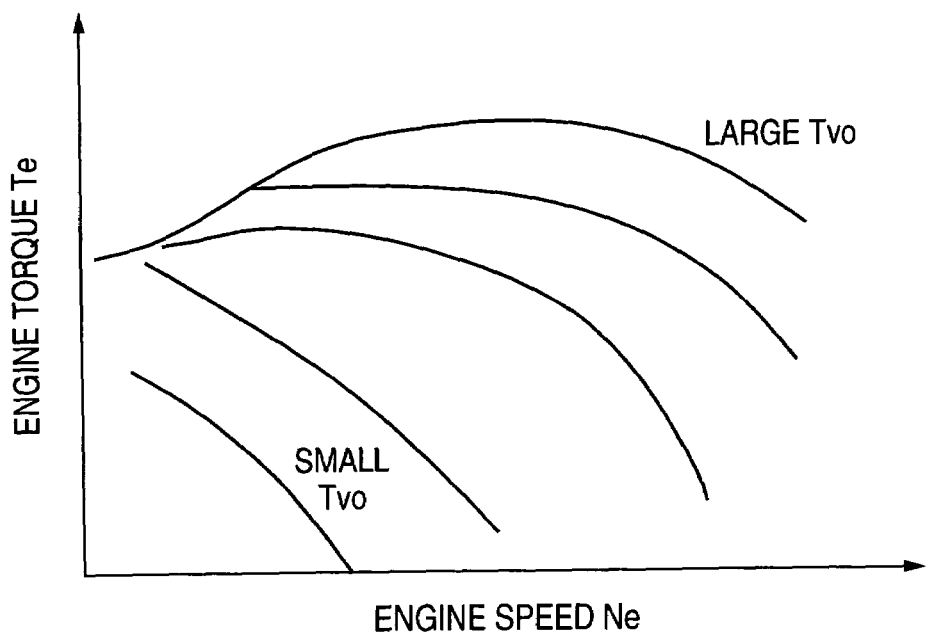
FIG. 4 illustrates a relationship between engine speed and engine torque.
Figure 5:
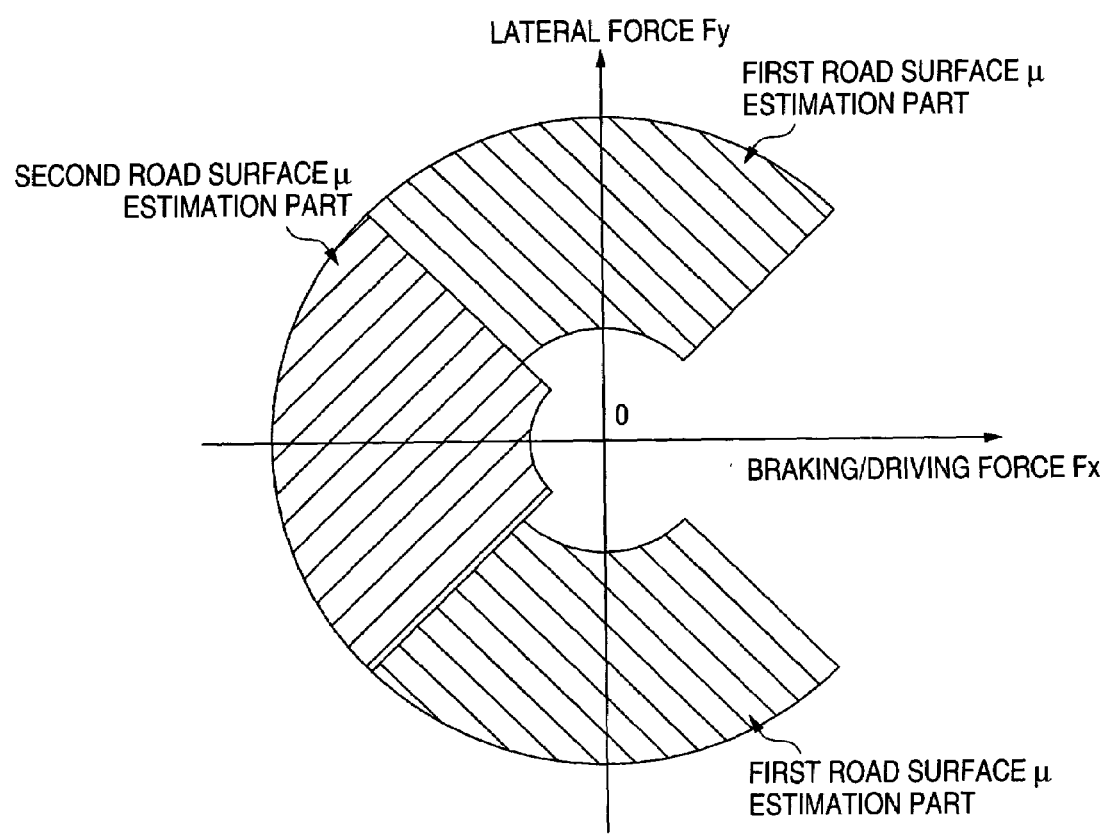
FIG. 5 is a map of road surface μ estimation units which are selected based on braking and driving forces and a lateral force.
Figure 6:
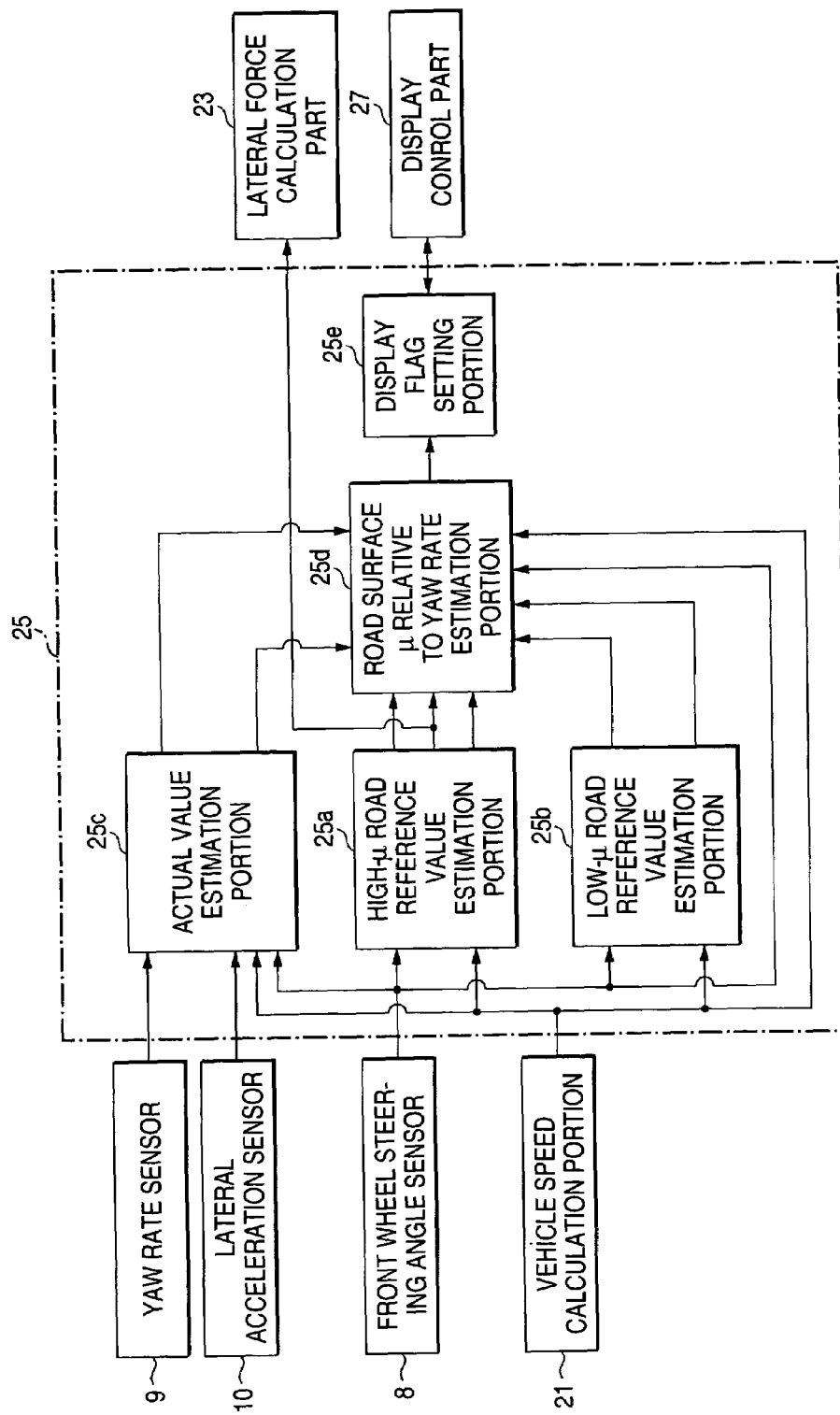
FIG. 6 is a functional block diagram showing a configuration of a first road surface μ estimation unit.
Figure 7:
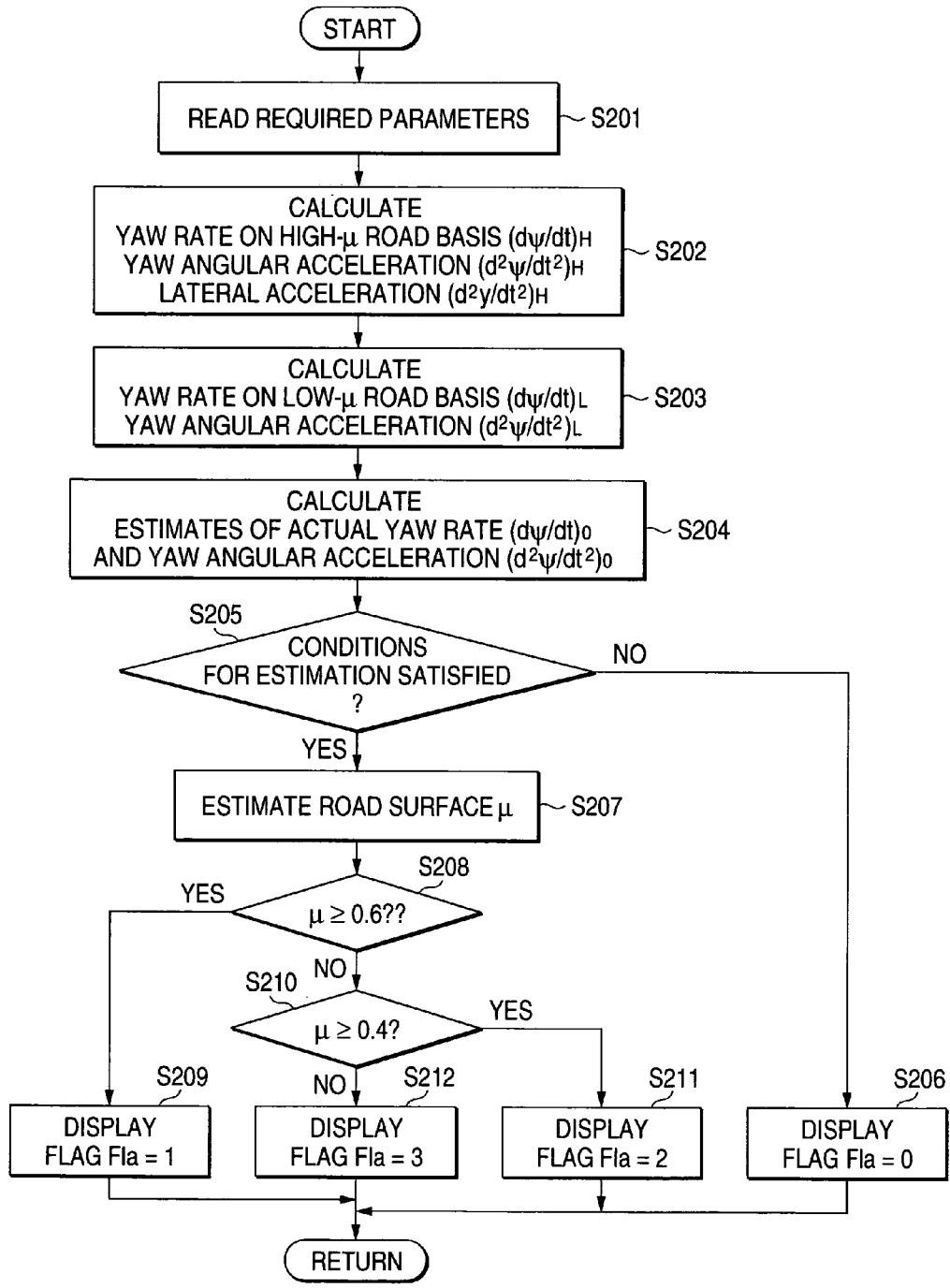
FIG. 7 is a flow chart of a display flag setting program of the first road surface μ estimation unit.
Figure 8:
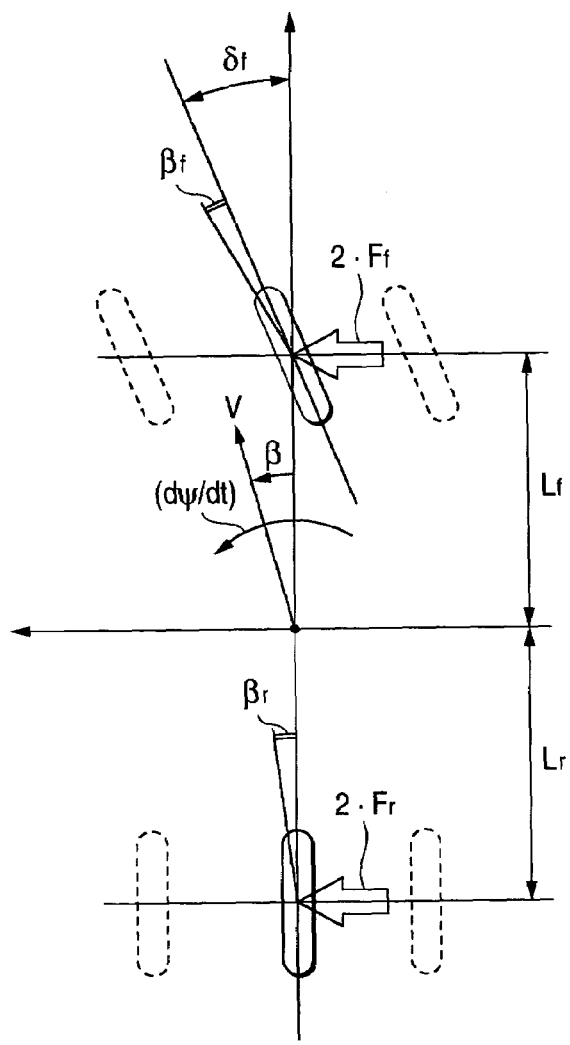
FIG. 8 illustrates a two-wheeled vehicle model that is equivalent to a four-wheeled vehicle.
Figure 9:
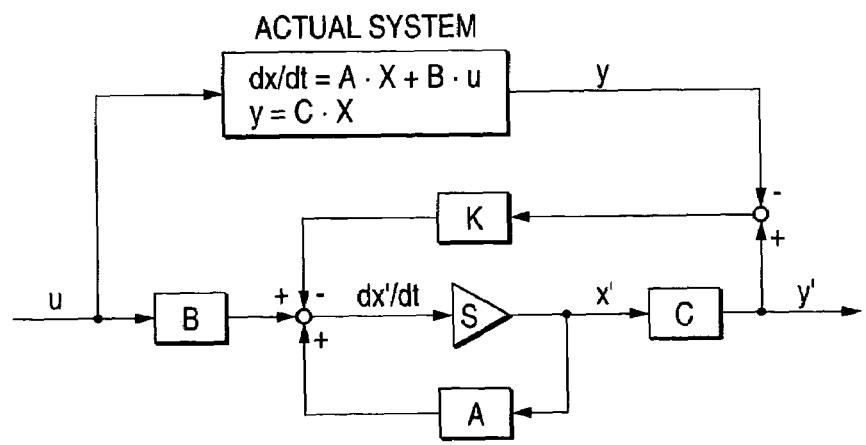
FIG. 9 illustrates a configuration of an observer.
Figure 10:
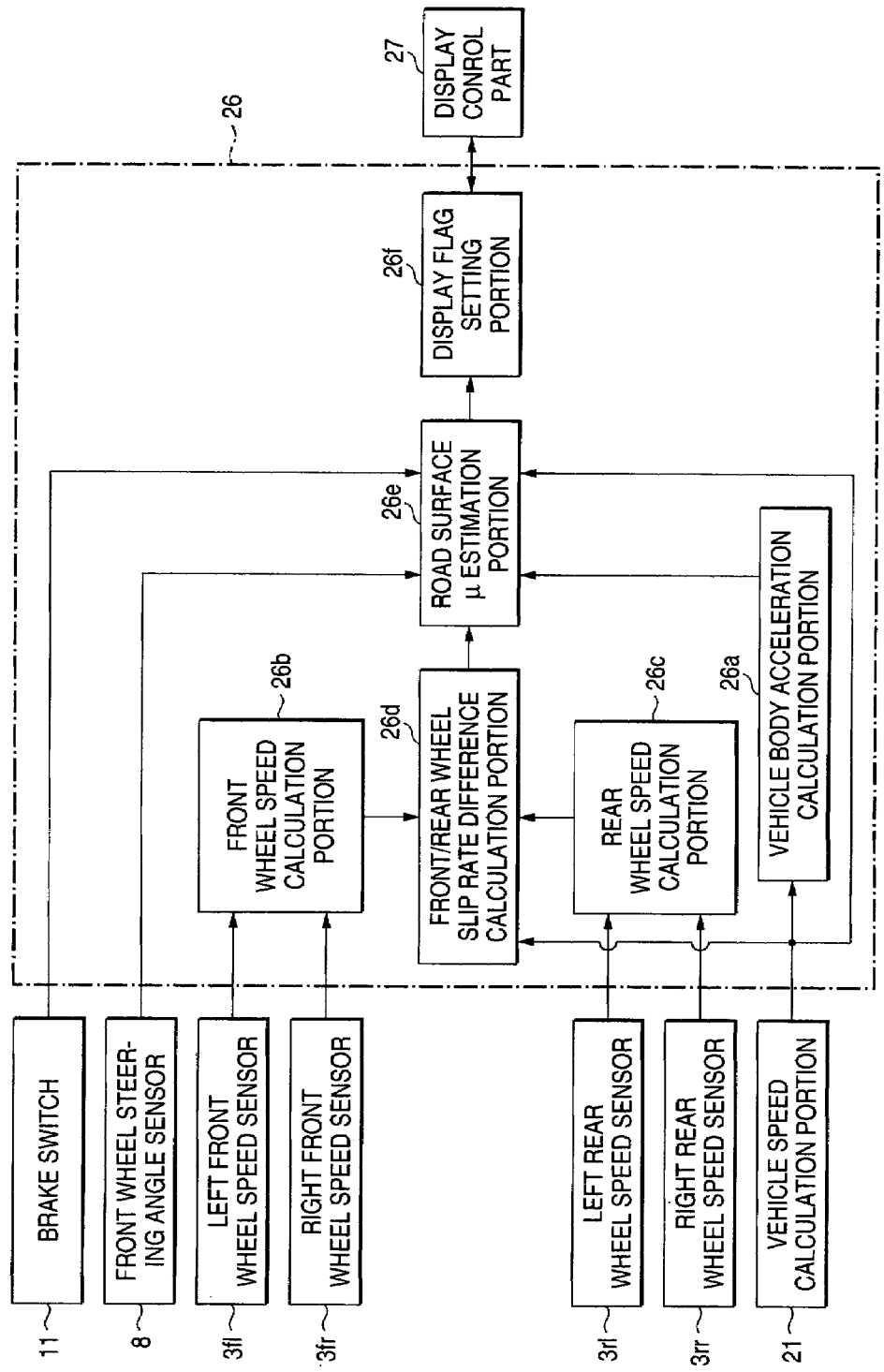
FIG. 10 is a functional block diagram showing a configuration of a second road surface μ estimation unit.
Figure 11:
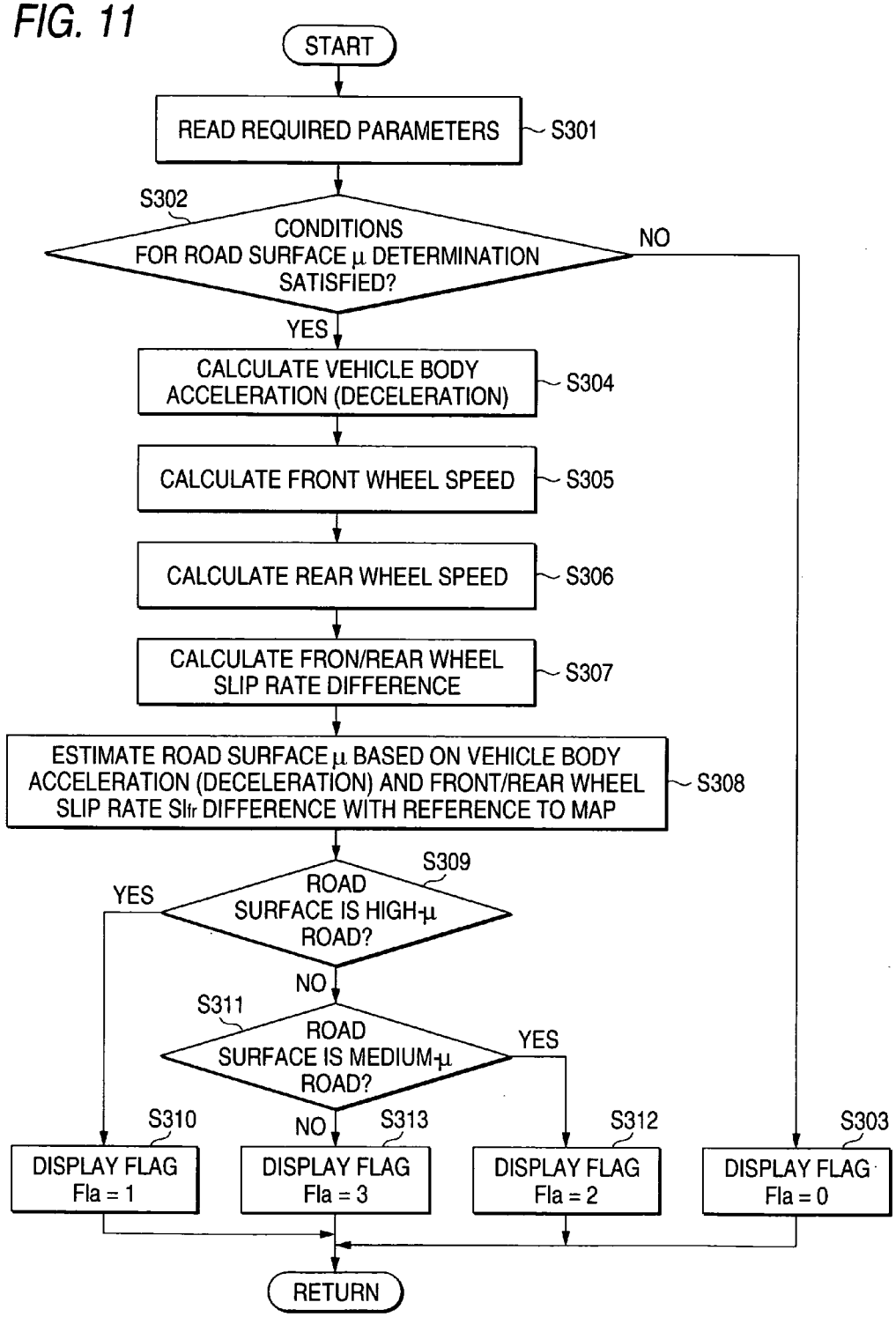
FIG. 11 is a flowchart of a display flag setting program of the second road surface μ estimation unit.
Figure 12:
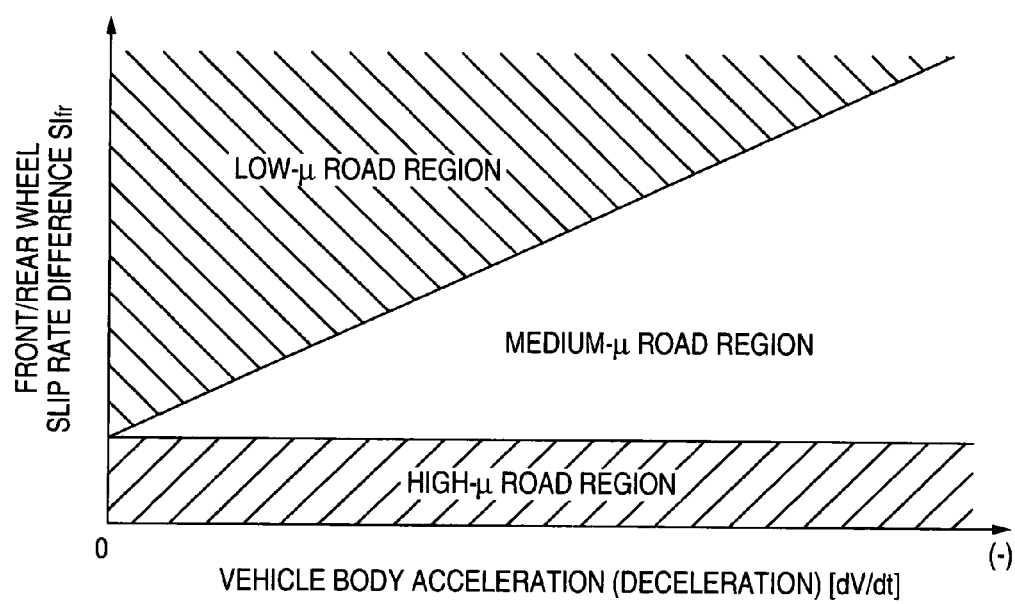
FIG. 12 illustrates a map of road surface μ which is set based on vehicle acceleration and differences between slip rates of front and rear wheels.

FIGS. 1 to 14C show an embodiment of the invention. FIG. 1 schematically illustrates a road surface frictional coefficient estimating apparatus for a vehicle as a whole. FIG. 2 is a flow chart of a road surface frictional coefficient display program. FIG. 3 illustrates a relationship between a pedaling force and a brake oil pressure. FIG. 4 illustrates a relationship between engine speed and engine torque. FIG. 5 is a map of road surface μ estimation units which are selected based on braking and driving forces and a lateral force. FIG. 6 is a functional block diagram showing a configuration of a first road surface μ estimation unit. FIG. 7 is a flow chart of a display flag setting program of the first road surface μ estimation unit. FIG. 8 illustrates a two-wheeled vehicle model that is equivalent to a four-wheeled vehicle. FIG. 9 illustrates a configuration of an observer. FIG. 10 is a functional block diagram showing a configuration of a second road surface μ estimation unit. FIG. 11 is a flow chart of a display flag setting program of the second road surface μ estimation unit. FIG. 12 illustrates a map of road surface μ's which is set based on vehicle acceleratioanand differences between slip rates of front and rear wheels.

Figure 14A:
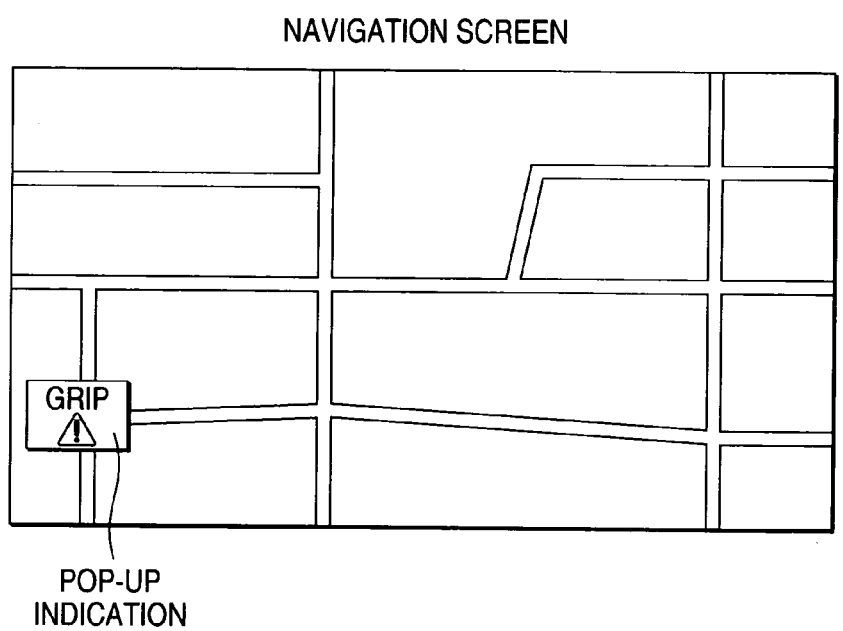
FIGS. 14A to 14C illustrate road surface μ conditions displayed on a navigation screen.
Figure 14B:
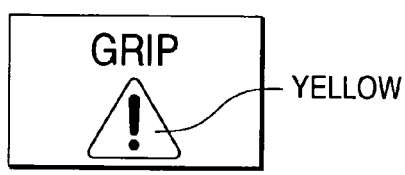
Figure 14C:
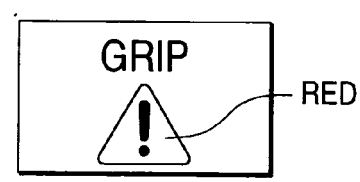

FIGS. 13A to 13D illustrate road surface μ conditions displayed on a screen. FIGS. 14A to 14C illustrate road surface μ conditions displayed on a navigation screen.

In FIG. 1, reference numeral 1 represents a road surface frictional coefficient estimating apparatus. In the road surface frictional coefficient estimating apparatus 1, various sensors and a brake switch 11 are connected to a main control unit 2 for displaying road surface μ conditions according to a road surface frictional coefficient display program which will be described later, the sensors including wheel speed sensors for the four wheels (a left front wheel speed sensor 3fl, a right front wheel speed sensor 3fr, a left rear wheel speed sensor 3rl, and a right rear wheel speed sensor 3rr), an engine speed sensor 4, a throttle opening sensor 5, a gear position sensor 6, a brake oil pressure sensor 7, a front wheel steering angle sensor 8, a yaw rate sensor 9, and a lateral acceleration sensor 10. Thus, the device receives the input of wheel speeds ωfl, ωfr, ωrl, and ωrr of the four respective wheels, an engine speed Ne, throttle opening Tvo, a gear position Gp, a master cylinder oil pressure Pmc, a front wheel steering angle δf, a yaw rate (yaw angular velocity) (dφ/dt), lateral acceleration ($d^2y/dt^2$), and brake on/off signals.

The main control unit 2 determines the mode of display according to a difference of road surface μ based on those input signals and displays road surface μ conditions on a display 12 such as a liquid crystal display provided on the instrument board.

The main control unit 2 is primarily composed of a vehicle speed calculation part 21, a braking/driving force calculation part 22, a lateral force calculation part 23, a road surface μ estimation selection part 24, a first road surface μ estimation part 25, a second road surface μ estimation part 26, and a display control part 27.

The vehicle speed calculation part 21 receives the input of the left rear wheel speed ωrl from the left rear wheel speed sensor 3rl and the right rear wheel speed ωrr from the right rear wheel speed sensor 3rr and outputs an average value ((ωrl+ωrr)/2), as a vehicle speed V, to the first road surface μ estimation part 25 and the second road surface μ estimation part 26.

The braking/driving force calculation part 22 receives the input of the engine speed Ne from the engine speed sensor 4, the throttle opening Tvo from the throttle opening sensor 5, the gear position Gp from the gear position sensor 6, and the master cylinder oil pressure mc from the brake oil pressure sensor 7.

For example, a braking/driving force Fx (=Ff+Fe) which acts on the wheels is calculated as follows on an assumption that the vehicle is currently traveling on a reference road surface (which is, for example, a flat road having a road surface μ of 1).

In this case, a total braking force Ff that acts on the wheels is obtained from the following equation.

$$Ff = -2 \cdot (FFt + FRr)$$ Equation 1

FFt and FRr represent a front wheel braking force (per wheel) and a rear wheel braking force (per wheel), respectively, which are expressed as follows.

$$FFt = ((\pi \cdot DWC^2/4) \cdot PFt \cdot CFt \cdot (Rb\_Ft/Rw))$$ Equation 2

$$FRr = ((\pi \cdot DWC^2/4) \cdot PRr \cdot CRr \cdot (Rb\_Rr/Rw))$$ Equation 3 where PFt and PRr represent brake oil pressures of the front and rear wheels, respectively, which are obtained from a map that is stored in advance (see FIG. 3) based on the master cylinder oil pressure Pmc, for example. In this case, for example, the front wheel brake oil pressure PFt is set equal to the master cylinder oil pressure Pmc, and the rear wheel brake oil pressure PRr is set such that it is decreased at a predetermined pressure reduction ratio to the master cylinder oil pressure Pmc on the way to the rear wheels. Further, DWC represents a wheel cylinder inner diameter; CFt and CRr represent brake factors of the front and rear wheels, respectively; Rb_Ft and Rb_Rr represent effective radii of brake rotors of the front and rear wheels, respectively; and Rw represents an effective radius of the tires.

A driving force (engine driving force) Fe that acts on the wheels is obtained by the following equation.

$$Fe = Tt \cdot fin/rt$$ Equation 4 where Tt represents torque generated downstream of a transmission gear; the reference symbol fin represents a final gear ratio; and rt represents the radius of the tires. The torque Tt downstream of the transmission gear is obtained by the following equation where Te represents engine torque; gr represents a transmission gear ratio; t_conv represents a torque conversion ratio; and η represents the efficiency of power transmission.

$$Tt = Te \cdot gr \cdot t\_conv \cdot \eta$$ Equation 5 where the engine torque Te is identified from a map (see FIG. 4) based on the engine speed Ne and the throttle opening Tvo, and the transmission gear ratio gr is defined based on a gear position Gp that is input.

A braking/driving force Fx thus calculated is output to a road surface μ estimation selection part 24.

The lateral force calculation part 24 receives the input of lateral acceleration $(d^2y/dt^2)_H$ to be described later on the basis of a high-μ road (μ=1.0) is input from the first road surface μ estimation part 25 to the lateral force calculation part 23. A lateral force Fy that acts on the wheels is calculated from the sum of the lateral acceleration $(d^2y/dt^2)_H$ and the mass M of the vehicle body (Fy=$(d^2y/dt^2)_H \cdot M$).

A lateral force Fy thus calculated is output to the road surface μ estimation selection part 24.

The road surface μ estimation selection part 24 receives the input of the braking/driving force Fx from the braking/driving force calculation part 22 and the lateral force Fy from the lateral force calculation part 23 and decides the road surface μ estimation part to be used for determination (to select the first road surface μ estimation part 25 or the second road surface μ estimation part 26 or nonperformance of determination) from the braking/driving force Fx and the lateral force Fy by referring to a preset map (FIG. 5), the decision being output to the display control part 27.

The frictional coefficient of rubber on a road surface is substantially in conformity with the Coulomb's law of friction. According to the fundamental nature of a frictional force, the resultant of in-plane forces in the respective directions (the resultant of the forces Fx and Fy) acting between the wheels (tires) and the road surface does not exceed the product of a frictional coefficient μ and a vertical load M·g (g represents gravitational acceleration). The following relationship exits between those factors.

$$(Fx^2 + Fy^2)^{1/2} \leq \mu \cdot M \cdot g$$ Equation 6

Referring now to FIG. 5, the state of the resultant of the braking/driving force Fx and the lateral force Fy acting on the wheels in a friction circle on a reference road surface (a flat road having a road surface μ of 1) is checked. Depending on the condition of the forces, a selection is made to decide the road surface μ estimation part to be used, i.e., the first road surface μ estimation part 25 which can accurately estimate a road surface μ with high accuracy when the lateral force Fy is acting or the second road surface μ estimation part 26 which can accurately estimate a road surface μ when the braking/driving force Fx acting is a braking force. No determination is made on the road surface μ in the case of a resultant force out of such areas.

As shown in FIG. 6, a front wheel steering angle δf from the front wheel steering angle sensor, a yaw rate (yaw angular velocity) (dφ/dt) from the yaw rate sensor 9, lateral acceleration ($d^2y/dt^2$) from the lateral acceleration sensor 10, and a vehicle speed V are input to the first road surface μ estimation part 25. Hereinafter, those values input to the first road surface μ estimation part 25 will be identified as sensor values by providing them with a suffix "S".

The first road surface μ estimation part 25 is primarily comprised of a high-μ road reference value estimation portion 25*a*, a low-μ road reference value estimation portion 25*b*, an actual value estimation portion 25*c*, a road surface μ relative to yaw rate estimation portion 25*d*, and a display flag setting portion 25*e*. It sets a display flag Fla depending on a road surface μ in accordance with a display flag setting program in the first road surface μ estimation part which will be described later and outputs the flag to the display control part 27.

The high μ road reference value estimation portion 25*a* receives the input of a vehicle speed Vs and a front wheel steering angle δfs, calculates an estimated yaw rate associated with the detected vehicle speed Vs and front wheel steering angle δfs, as a high μ road reference yaw rate $(d\phi/dt)_H$, using a preset model of vehicle motion based on an equation of motion of a vehicle on a high μ road, and outputs the result to the road surface μ relative to yaw rate estimation portion 25*d*.

In addition to the high-μ road reference yaw rate $(d\phi/dt)_H$, yaw angular acceleration $(d^2\phi/dt^2)_H$ on the basis of a high-μ road is output from the high-μ road reference value estimation portion 25*a* to the road surface μ relative to yaw rate estimation portion 25*d*, and lateral acceleration $(d^2ydt^2)_H$ on the basis of a high-μ road is output to the road surface μ relative to yaw rate estimation portion 25*d* and the lateral force calculation part 23. The suffix "H" added to each parameter output from the high-μ road reference value estimation portion 25*a* indicates a parameter on the basis of a road having a high μ.

The low road surface μ estimation portion 25*b* receives the input of the vehicle speed Vs and the front wheel steering angle δfs, calculates an estimated yaw rate associated with the detected vehicle speed Vs and front wheel steering angle δfs, as a low-μ road reference yaw rate $(d\phi/dt)_L$, using a preset model of vehicle motion based on an equation of motion of a vehicle on a low-μ road, and outputs the result to the road surface μ relative to yaw rate estimation portion 25*d*.

In addition to the low-μ road reference yaw rate $(d\phi/dt)_L$, yaw angular acceleration $(d^2\phi/dt^2)_L$ on the basis of a low-μ road is output from the low-μ road reference value estimation portion 25*b* to the road surface μ relative to yaw rate estimation portion 25*d*. The suffix "L" added to each parameter output from the low-μ road reference value estimation portion 25*b* indicates a parameter on the basis of a road having a low μ.

A description will now be made with reference to FIG. 8 on the model of vehicle motion and parameters used in the high-μ road reference value estimation portion 25*a* and the low-μ road reference value estimation portion 25*b*. In the model of vehicle motion shown in FIG. 8, an equation of motion associated with a translational motion of a vehicle in the lateral direction thereof is given as follows where Fr and Fr represent a cornering force (per wheel) of the front and rear wheels, respectively;M represents the mass of the vehicle; and ($d^2y/dt^2$) represents lateral acceleration.

$$M \cdot (d^2y/dt^2) = 2 \cdot Ff + 2 \cdot Fr \qquad \text{Equation 7}$$

An equation of motion associated with a rotational motion about the point of center of gravity is as follows where Lf and Lr represent distances from the center of gravity to the front and rear wheel shafts, respectively; and ($d^2\phi/dt^2$) represents moment of inertia of yawing of the vehicle.

$$Iz \cdot (d^2\phi/dt^2) = 2 \cdot Ff \cdot Lf - 2 \cdot Fr \cdot Lr \qquad \text{Equation 8}$$

The lateral acceleration ($d^2y/dt^2$) is expressed as follows where β represents an angle of a slip of the vehicle body; and (dβ/dt) represents an angular velocity of the slip of the vehicle body.

$$(d^2y/dt^2) = V \cdot ((d\beta/dt) + (d\phi/dt)) \qquad \text{Equation 9}$$

The cornering forces exhibit a response similar to a first-order lag to the angle of a lateral slip of the tires. They can be linearized as follows by neglecting such a delay in response and using equivalent cornering power obtained by reflecting suspension characteristics in tire characteristics.

$$Ff = -Kf \cdot \beta f \qquad \text{Equation 10}$$

$$Fr = -Kr \cdot \beta r \qquad \text{Equation 11}$$

where Kf and Kr represent equivalent cornering power of the front and rear wheels, respectively; and βf and βr represent angles of the lateral slip of the front and rear wheels, respectively.

The angles βf and βr of the lateral slip of the front and rear wheels can be simplified as follows where δf represents a steering angle of the front wheel using the equivalent cornering power Kf and Kr on an assumption that the influence of the roll and suspension is reflected in the equivalent cornering power Kf and Kr.

$$\beta r = \beta - Lr \cdot (d\phi/dt)/V \qquad \text{Equation 13}$$

The above equations of motions can be settled into a state equation as follows.

$$(dx(t)/dt) = A \cdot x(t) + B \cdot u(t) \qquad \text{Equation 14}$$

$$x(t) = [\beta d\phi/dt]]^T$$

$$u(t) = [\delta 0]^T$$

$$A = \begin{bmatrix} a11 & a12 \\ a21 & a22 \end{bmatrix}$$

$$B = \begin{bmatrix} b11 & b12 \\ b21 & b22 \end{bmatrix}$$

$$a11 = -2 \cdot (Kf + Kr)/(M \cdot V)$$

$$a12 = -1 - 2 \cdot (Lf \cdot Kf - Lr \cdot Kr)/(M \cdot V^2)$$

$$a21 = -2 \cdot (Lf \cdot Kf - Lr \cdot Kr)/Iz$$

$$a22 = -2 \cdot (Lf^2 \cdot Kf + Lr^2 \cdot Kr)/(Iz \cdot V)$$

$$b11 = 2 \cdot Kf/(M \cdot V)$$

$b21=2 \cdot Lf \cdot Kf/Iz$ $b12=b22=0$

At the high-μ road reference value estimation portion in time of interest. The calculated angular velocity $(d\beta/dt)_L$ of a slip of the vehicle body and the yaw angular acceleration $(d^2\phi/dt^2)_L$ are integrated to obtain an angle $\beta L$ of a slip of the vehicle body and a yaw rate $(d\phi/dt)_L$ on the basis of a low-μ road.

The actual value estimation portion 25c is an observer formed using a model of vehicle motion, which receives the input of the vehicle speed Vs, the front wheel steering angle δfs, lateral acceleration $(dy^2/dt^2)_s$, and a yaw rate $(d\phi/dt)_s$ and calculates an estimate of an actual yaw $(d\phi/dt)_o$ while feeding back actual behaviors of the vehicle. The actual yaw rate $(d\phi/dt)_o$ calculated by the actual value estimation portion 25c is output to the road surface μ relative to yaw rate estimation portion 25d. In addition to the actual yaw rate $(d\phi/dt)_o$, the actual value estimation portion 25c outputs yaw angular acceleration $(d^2\phi/dt^2)_o$ to the road surface μ relative to yaw rate estimation portion 25d. The suffix "O" added to each parameter output by the actual value estimation portion 25c indicates that the parameter originates from the observer.

A configuration of the observer of the present embodiment will now be described with reference to FIG. 9.

Let us assume that an output which can be measured in time of interest. The calculated angular velocity $(d\beta/dt)_L$ of a slip of the vehicle body and the yaw angular acceleration $(d^2\phi/dt^2)_L$ are integrated to obtain an angle $\beta L$ of a slip of the vehicle body and a yaw rate $(d\phi/dt)_L$ on the basis of a low-μ road.

The actual value estimation portion 25c is an observer formed using a model of vehicle motion, which receives the input of the vehicle speed Vs, the front wheel steering angle δfs, lateral acceleration $(dy^2/dt^2)_s$, and a yaw rate $(d\phi/dt)_s$ and calculates an estimate of an actual yaw $(d\phi/dt)_o$ while feeding back actual behaviors of the vehicle. The actual yaw rate $(d\phi/dt)_o$ calculated by the actual value estimation portion 25c is output to the road surface μ relative to yaw rate estimation portion 25d. In addition to the actual yaw rate $(d\phi/dt)_o$, the actual value estimation portion 25c outputs yaw angular acceleration $(d^2\phi/dt^2)_o$ to the road surface μ relative to yaw rate estimation portion 25d. The suffix "O" added to each parameter output by the actual value estimation portion 25c indicates that the parameter originates from the observer.

A configuration of the observer of the present embodiment will now be described with reference to FIG. 9.

Let us assume that an output which can be measured (or which can be detected by a sensor) is expressed as follows.

$$y(t)=C \cdot x(t) \qquad \text{Equation 15}$$

25a, for example, equivalent cornering power Kf and Kr for a road surface μ of 1.0 are set in Equation 14 in advance, and the angular velocity $(d\beta/dt)_H$ of a slip of the vehicle body and the yaw angular acceleration $(d^2\phi/dt^2)_H$ are calculated by calculating $(dx(t)/dt)=[(d\beta/dt)\ (d^2\phi/dt^2)]^T$ in the state of vehicle motion (the vehicle speed Vs and the front wheel steering angle δfs) at each point in time of interest. The calculated angular velocity $(d\beta/dt)_H$ of a slip of the vehicle body and the yaw angular acceleration $(d^2\phi/dt^2)_H$ on the basis of a low-μ road are integrated to obtain an angle of a slip of the vehicle $\beta H$ and a yaw rate $(d\phi/dt)_H$ on the basis of a high-μ road. A high-μ road reference angle $\beta f_H$ of a slip of the front wheel is calculated by substituting the angle $\beta_H$ of the slip of the vehicle body and the yaw rate $(d\phi/dt)_H$ in Equation 12. Further, a high-μ road reference lateral acceleration $(d^2y/dt^2)_H$ is calculated by substituting the angular velocity $(d\beta/dt)_H$ and the yaw rate $(d\phi/dt)_H$ on the basis of a high-μ road in Equation 9.

Similarly, at the low-μ road reference value estimation portion 25b, for example, equivalent cornering power Kf and Kr for a road surface μ of 0.3 are set in Equation 14 in advance, and the angular velocity $(d\beta/dt)_L$ of a slip of the vehicle body and the yaw angular acceleration $(d^2\phi/dt^2)_L$ on the basis of a low-μ road are calculated by calculating $(dx(t)/dt)=[(d\beta/dt)\ (d^2\phi/dt^2)]^T$ in the state of vehicle motion (the vehicle speed Vs and the front wheel steering angle δfs) at each point Then, the observer has a configuration expressed by:

$$(dx'(t)/dt)=(A-K \cdot C) \cdot x'(t)+K \cdot y(t)+B \cdot u(t) \qquad \text{Equation 16}$$

When the observer is applied to the model of vehicle motion, x(t) represents a state variable vector (the symbol (') of x' (t) indicates that the vector is an estimated value); u(t) represents an input vector; and A and B represent matrices of coefficients of a state equation, the terms corresponding to those described above. Further, y(t) represents a measurable sensor output vector which is expressed by:

$$y(t)=[\beta s \ (d\phi/dt)_s]^T$$

From the relationship expressed by Equation 9, a sensor-originated angle $\beta s$ of the slip of the vehicle body is obtained by integrating the sensor-originated lateral acceleration $(d^2y/dt^2)_s$ and a sensor-originated angular velocity $(d\beta/dt)_s$ of a slip of the vehicle body obtained based on the yaw rate $(d\phi/dt)_s$. Further, C represents a matrix (which is a unit matrix in the present embodiment) indicating a relationship between sensor outputs and state variables, and K represents a feedback gain matrix which may be arbitrarily set. The matrices are as follows.

$$c = \begin{bmatrix} 1 & 0 \\ 0 & 1 \end{bmatrix}$$

$$K = \begin{bmatrix} k11 & k12 \\ k21 & k22 \end{bmatrix}$$

From those relationships, the observer calculates estimates of the yaw angular acceleration $(d^2\phi/dt^2)_o$ and the angular velocity $(d\beta/dt)_o$ of a slip of the vehicle body using Equations 17 and 18 shown below.

$$(d^2\phi/dt^2)_o=a11 \cdot (d\phi/dt)_o+a12 \cdot \beta O+b11 \delta fs+k11 \cdot ((d\phi/dt)_s-(d\phi/dt)_o)+k12 \cdot (\beta s-\beta O) \qquad \text{Equation 17}$$

$$(d\beta/dt)_o=a21 \cdot (d\phi/dt)_o+a22 \cdot \beta O+k21 \cdot ((d\phi/dt)_s-(d\phi/dt)_o)+k22 \cdot (\beta s-\beta O) \qquad \text{Equation 18}$$

The yaw angular acceleration $(d^2\phi/dt^2)_o$ and the angular velocity $(d\beta/dt)$ of a slip of the vehicle body thus calculated are integrated to calculate an actual yaw rate $(d\phi/dt)_o$ and an angle $\beta O$ of a slip of the vehicle body. Further, the angle $\beta O$ of the slip of the vehicle body and the actual yaw rate $(d\phi/dt)_o$ are substituted in Equation 12 to calculate an actual angle $\beta fO$ of the slip of the front wheel.

The calculations at the high-μ road reference value estimation portion 25a, the low-μ road reference value estimation portion 25b, and the actual value estimation portion 25c are disabled when the vehicle speed Vs equals 0 because the calculations then constitute division by 0. Therefore, sensor values are used as the yaw rate and lateral acceleration at very low speeds (e.g., speeds below 10 km/h). That is:

$$(d\phi/dt)_H=(d\phi/dt)_L=(d\phi/dt)_o=(d\phi/dt)_s$$

$$(d^2y/dt^2)_o=(d^2y/dt^2)_s$$

The angles of the slip of the vehicle body satisfy the following because of a geometrical relationship between steady circular turns.

$$\beta H=\beta L=\beta O=\delta fs \cdot Lr/(Lf+Lr)$$

At this time, the angles of the slip of the front wheel are all 0 because there is no cornering force.

$$\beta fH=\beta fL=\beta fO=0$$

The road surface μ relative to yaw rate estimation portion 25d receives the input of the vehicle speed Vs, a sensor value of the front wheel steering angle δfs, the yaw rate $(d\phi/dt)_H$, the yaw angular acceleration $(d^2\phi/dt^2)_H$, and the lateral acceleration $(d^2y/dt^2)_H$ on the high-μ road basis, the yaw rate $(d\phi/dt)_L$ and the yaw angular acceleration $(d^2\phi/dt^2)_L$ on the low-μ road basis, and the yaw rate $(d\phi/dt)_o$ and the yaw angular acceleration $(d^2\phi/dt^2)_o$ which have been estimated as actual values. When conditions for execution to be described later are satisfied, a new estimated road surface μ value μγn is calculated based on Equation 19 that is shown below from the yaw rate $(d\phi/dt)_H$ on the high-μ road basis, the yaw rate $(d\phi/dt)_L$ on the low-μ road basis, and the yaw rate $(d\phi/dt)_o$.

In the equation, μH represents a road surface frictional coefficient (e.g., 1.0) assumed in advance in the high-μ road reference value estimation portion 25a, and μL represents a road surface frictional coefficient (e.g., 0.3) assumed in advance in the low-μ road reference value estimation portion 25b.

$$\mu\gamma n=((\mu H-\mu L)\cdot(d\phi/dt)_o+\mu L\cdot(d\phi/dt)_H-\mu H\cdot(d\phi/dt)_L)/((d\phi/dt)_H-(d\phi/dt)_L) \quad \text{Equation 19}$$

That is, according to Equation 19, a linear function is formed by the yaw rate $(d\phi/dt)_H$ on the high-μ road basis and the yaw rate $(d\phi/dt)_L$ on the low-μ road basis; the yaw rate $(d\phi/dt)_o$ is substituted in the linear function to obtain a road surface μ which constitutes a new estimated road surface μ value μγn based on comparison with a yaw rate.

As apparent from Equation 20 shown below, the weighted mean of a previous estimated road surface μ value μn-1 based on comparison with a yaw rate and the current estimated road surface μ value μγn is obtained to calculate an estimated road surface μ value μ based on comparison with a yaw rate, the value μ being output to the display flag setting portion 25e.

$$\mu=\mu n-1+k1\cdot(\mu\gamma n-\mu n-1) \quad \text{Equation 20}$$

where the weight function k1 was set in advance as follows based on an assumption that an estimated value would be more reliable the greater the difference between the yaw rate $(d\phi/dt)_H$ on the high-μ road basis and the yaw rate $(d\phi/dt)_L$ on the low-μ road basis.

$$k1=0.3\cdot|(d\phi/dt)_H-(d\phi/dt)_L|/|(d\phi/dt)_H| \quad \text{Equation 21}$$

The following conditions are set in advance as conditions for the calculation of the estimated road surface μ value μ based on comparison with a yaw rate at the road surface μ relative to yaw rate estimation portion 25d.

(1-1) A vehicle that is inherently a multi-degree-of-freedom system is approximated by two degrees of freedom in lateral movement and movement about an vertical axis, and a two-wheeled model is employed. Therefore, the calculation is not carried out at the time of driving at a low speed or steering through a great angle when there will be a great difference from the behavior of the actual vehicle. For example, the calculation is not carried out when the vehicle speed Vs is lower than 10 km/h and when the absolute value of a steering angle is greater than 500 deg.

(1-2) In consideration to the influence of electrical noises in values input from the sensors and disturbances that are not considered at the stage of modeling, the calculation is not carried out in the case of a small yaw rate absolute value at which the influence of noises and disturbances becomes relatively significant. For example, the calculation is not carried out when the absolute value of the yaw rate $(d\phi/dt)$ is smaller than the 1.5 deg/s.

(1-3) Since a road surface μ is estimated taking advantage of the fact that a cornering force can vary depending on road surface μ's, the calculation is not carried out in the case of a small cornering force at which the influence of noises and disturbances becomes more significant relative to the influence of a road surface μ or when lateral acceleration that is proportionate to a cornering force has a small absolute value. For example, the calculation is not carried out when the absolute value of the lateral acceleration $(d^2y/dt^2)$ on the high-μ road basis is smaller than 0.15 G.

(1-4) The response of a yaw rate to an input of a steering angle depends on the road surface μ, and a delay can therefore occur in the same. A road surface μ estimated in the presence of such a delay can include a great error. Therefore, the calculation is not carried out when there is a significant delay or when it can be judged that there will be a great increase in an error attributable to a delay. For example, the calculation is not carried out when it can be judged that there will be a great increase in an error attributable to a delay at times other than the time of the rise of a yaw rate (a preset range between the occurrence of a yaw rate and the transition of the same toward convergence). The rise of a yaw rate is determined from (yaw rate)·(yaw angular acceleration).

(1-5) The calculation is not carried out when the absolute value of a difference between a yaw rate on the high-μ road basis and a yaw rate on the low-μ road basis is not sufficiently great in consideration to the influence of noises and disturbances. For example, the calculation is not carried out when the absolute value of a difference between the yaw rate $(d\phi/dt)_H$ on the high-μ road basis and the yaw rate $(d\phi/dt)$ on the low-μ road basis is smaller than 1 deg/s.

(1-6) In order to prevent Equation 21 from becoming division by 0, for example, the calculation is not carried out when the absolute value of the the yaw rate $(d\phi/dt)_H$ on the high-μ road basis is smaller than 1 deg/s.

According to the estimated road surface μ value μ input from the road surface μ relative to yaw rate estimation portion 25d, the display flag setting portion 25e sets a display flag Fla to be output to the display control unit 27 as follows. When it can be determined that the vehicle is on a road having a high μ from an estimated road surface μ value μ that is equal to or greater than 0.6, the display flag Fla is set at 1 and output. When it can be determined that the vehicle is on a road having a medium μ from an estimated road surface μ value μ that is equal to or greater than 0.4, the display flag Fla is set at 2 and output. When it can be determined that the vehicle is on a road having a low μ from an estimated road surface μ value μ that is smaller than 0.4, the display flag Fla is set at 3 and output. Further, when the road surface μ is not estimated, for example, in the cases that the vehicle is in one of the above conditions of (1-1) to (1-6), the display flag Fla is set at 0 and output.

A flow chart of a display flag setting program executed by the above-described first road surface μ estimation part 25 is shown in FIG. 7. First, required parameters are read at step (hereinafter abbreviated as "S") 201, and the high-μ road reference value estimation portion 25a calculates the yaw rate $(d\phi/dt)_H$ on the high-μ road basis, the yaw angular acceleration $(d^2\phi/dt^2)_H$ on the high-μ road basis, and the lateral acceleration $(d^2y/dt^2)_H$ on the high-μ road basis at S202.

Next, the low-μ road reference value estimation portion 25b calculates the yaw rate $(d\phi/dt)_L$ on the low-μ road basis, the yaw angular acceleration $(d^2\phi/dt^2)_L$ on the low-μ road basis, and the lateral acceleration $(d^2y/dt^2)_L$ on the low-μ road basis at S203.

Next, the actual value estimation portion 25c calculates the actual yaw rate $(d\phi/dt)_o$ on the high-μ road basis and yaw angular acceleration $(d^2\phi/dt^2)_o$ at S204.

The process then proceeds to S205 at which the road surface μ relative to yaw rate estimation portion 25d determines whether conditions for estimating a road surface μ have been satisfied by avoiding the conditions described at the above (1-1) to (1-6). When it is determined that estimation of a road surface μ is disabled because any of the conditions (1-1) to (1-6) exits, the process proceeds to S206 at which the display flag setting portion 25e sets the display flag Fla at 0, the process then exiting the program.

When it is determined at S205 that all of the conditions (1-1) to (1-6) have been avoided and conditions for estimating a road surface μ have been satisfied, the process proceeds to S207 at which the road surface μ relative to yaw rate estimation portion 25d calculates an estimated road surface μ value μ based on comparison with a yaw rate using Equation 20.

The process then proceeds to S208 at which it is determined whether the estimated road surface μ value μ is equal to or greater than 0.6 (μ≧0.6) or whether the vehicle is on a road having a high μ. When it can be determined that the vehicle is on a road having a high μ from an estimated road surface μ value μ equal to or greater than 0.6 (μ≧0.6), the process proceeds to S209 at which the display flag setting portion 25e sets the display flag Fla at 1 and exits the program.

When it is determined at S208 that the estimated road surface μ value μ is smaller than 0.6, the process proceeds to S210 at which it is determined whether the estimated road surface μ value μ is equal to or greater than 0.4 (μ≧0.4) or whether the vehicle is on a road having a medium μ. When it can be determined that the vehicle is on a road having a medium μ from an estimated road surface μ value μ equal to or greater than 0.4 (μ≧0.4), the process proceeds to S211 at which the display flag setting portion 25e sets the display flag Fla at 2 and exits the program. When it can be conversely determined at S210 that the vehicle is on a road having a low μ from an estimated road surface μ value μ smaller than 0.4, the process proceeds to S212 at which the display flag setting portion 25e sets the display flag Fla at 3 and exits the program.

As shown in FIG. 10, the second road surface μ estimation part 26 receives the input of wheel speeds ωfl, ωfr, ωrl, and ωrr from the wheel speed sensors 3fl, 3fr, 3rl, and 3rr for the four wheels, a front wheel steering angle δf from the front wheel steering angle sensor 8, brake on/off signals from the brake switch 11, and a vehicle speed V from the vehicle speed calculation part 21. In the present embodiment, the vehicle speed calculation part 21 is a vehicle speed detection unit.

The second road surface μ estimation part 26 is primarily comprised of a vehicle body acceleration calculation portion 26a, a front wheel speed calculation portion 26b, a rear wheel speed calculation portion 26c, a front/rear wheel slip rate difference calculation portion 26d, a road surface μ estimation portion 26e, and a display flag setting portion 26f. This part sets a display flag Fla depending on road surface μ's according to a display flag setting program in the second road surface μ estimation part to be described later and outputs it to the display control part 27.

The vehicle body acceleration calculation portion 26a is provided as a vehicle deceleration detection unit to which the vehicle speed V is input and which calculates a differentiated value of the vehicle speed V to obtain vehicle body acceleration (dV/dt) and outputs it to the road surface μ estimation portion 26e. The vehicle acceleration (dV/dt) indicates deceleration of the vehicle body when it has a negative sign (−).

The front wheel speed calculation portion 26b is provided as a front wheel speed detection unit to which the wheel speeds ωfl and ωfr of the front wheels are input and which calculates an average value of them to provide a front wheel speed VF. That is, VF=(ωfl+ωfr)/2. The front wheel speed VF thus calculated is output to the front/rear wheel slip rate difference calculation portion 26d.

The rear wheel speed calculation portion 26c is provided as a rear wheel speed detection unit to which the wheel speeds ωrl and ωrr of the rear wheels are input and which calculates an average value of them to provide a rear wheel speed VR. That is, VR=(ωrl+ωrr)/2. The rear wheel speed VR thus calculated is output to the front/rear wheel slip rate difference calculation portion 26d.

The front/rear wheel slip rate difference calculation portion 26d receives the input of the vehicle speed V, the front wheel speed VF, and the rear wheel speed VR and which calculates a slip rate difference Slfr between the front and rear wheels using Equation 22 shown below and out puts the result to the road surface μ estimation portion 26e.

$$Slfr=(VF-VR)/V \qquad \text{Equation 22}$$

The road surface μ estimation portion 26e receives the input of the front wheel steering angle δf, the brake on/off signals, the vehicle speed V, the vehicle body acceleration (deceleration) (dV/dt), and the slip rate difference Slfr between the front and rear wheels. This portion determines that conditions for road surface determination have been satisfied when the brake is on; the front wheel steering angle δf is equal to or smaller than a preset value; and the vehicle speed V is equal to or smaller than a preset value. Then, the estimation portion refers to a preset map of the vehicle body deceleration (dV/dt) and the slip rate difference Slfr between the front and rear wheels (FIG. 12) to determine the state of the road surface, the state being determined as a road having a high μ, a road having a medium μ or a road having a low μ. The map in FIG. 12 has been created based on data of front/rear wheel slip rate differences Slfr relative to vehicle deceleration (dV/dt) plotted in advance. In the region of front/rear wheel slip rate differences Slfr smaller than a preset value, a road is determined as having a high μ regardless of the value of vehicle body deceleration (dV/dt). The boundary between the region of high-μ roads and the region of low-μ roads is approximated by a linear function. A road that is located on or above the boundary is determined as having a low μ, and the region below the boundary excluding the region of high-μ roads constitutes a region of medium-μ roads. Thus, the result of determination at the road surface μ estimation portion 26e is output to the display flag setting portion 26f.

According to the result of the road surface μ estimation input from the road surface μ estimation portion 26e, the display flag setting portion 26f sets the display flag Fla to be output to the display control part 17 as follows. Specifically, the display flag Fla is output at 1 when the estimation results indicates a high-μ road; the display flag Fla is output at 2 when the estimation results indicates a medium-μ road; and the display flag Fla is output at 3 when the estimation results indicates a low-μ road. The display flag Fla is output at 0 when there is no output of road surface μ estimation result because the above-described conditions for determination have not been satisfied.

A flow chart of a display flag setting program executed by the second road surface μ estimation part 26 is shown in FIG. 11. First, required parameters are read at S301.

The process then proceeds to S302 at which the road surface μ estimation portion 26e determines whether the conditions for determination of a road surface μ have been satisfied (i.e., whether the brake is on; the front wheel steering angle δf is equal to or smaller than a preset value; and the vehicle speed V is equal to or smaller than a preset value). If the conditions for determination of a road surface μ have not been satisfied, the process proceeds to S303 at which the display flag setting portion 26f sets the display flag Fla at 0 and exits the program.

When it is determined at S302 that the conditions for determination of a road surface μ have been satisfied, the process proceeds to S304 at which the vehicle body acceleration calculation portion 26a calculates the vehicle body acceleration (deceleration) (dV/dt). The process then proceeds to S305 at which the front wheel speed calculation portion 26b calculates the front wheel speed VF, and the process then proceeds to S306 at which the rear wheel speed calculation portion 26c calculates the rear wheel speed VR.

The process then proceeds to S307 at which the front/rear wheel slip rate difference calculation portion 26d calculates the front/rear wheel slip rate difference Slfr using Equation 22. The process then proceeds to S308 at which the road surface μ estimation portion 26e estimates a road surface μ with reference to the map in FIG. 12 based on the vehicle body acceleration (deceleration) (dV/dt) and the front/rear wheel slip rate difference Slfr.

Thereafter, the process proceeds to S309 at which the display flag setting portion 26f determines whether the result of road surface μ estimation indicates a high-μ road. If the result of road surface μ estimation indicates a high-μ road, the process proceeds to S310 at which the process exits the program after the display flag Fla is set at 1.

If the result of determination at S309 indicates that the road surface μ estimation result does not indicate a high-μ road, the process proceeds to S311 at which it is determined whether the road surface μ estimation result indicates a medium-μ road. If the result of road surface μ estimation indicates a medium-μ road, the process proceeds to S312 and exits the program after the display flag Fla is set at 2.

If the result of determination at S311 indicates that the road surface μ estimation result does not indicate a medium-μ road (if it indicates a low-μ road), the process proceeds to S313 and exits the program after the display flag Fla is set at 3.

The display control part 27 receives the input of a decision on the road surface μ estimation part to be used for determination (the first road surface μ estimation part 25 or the second road surface μ estimation part 26 or no decision) decided based on the map in FIG. 5 from the road surface μ estimation selection part 24 and reads the display flag Fla from the relevant road surface μ estimation part. When there is no decision, the display flag Fla is set at 0. For example, indications according to respective display flags Fla are selected as follows and presented on the display 12.

(i) When the display flag is 0 (when no result of road surface μ estimation is available), nothing is displayed but the road and characters reading "grip" as identified as "indication 0" in FIG. 13A.

(ii) When the display flag Fla is 1 (when the road is a high-μ road), the vehicle is displayed in green on the road as identified as "indication 1" in FIG. 13B.

(iii) When the display flag Fla is 2 (when the road is a medium-μ road), the vehicle and straight traces of driving are displayed in yellow on the road as identified as "indication 2" in FIG. 13C, and a common triangular indication is shown in yellow to warn the driver under the characters reading "grip".

(iv) When the display flag Fla is 3 (the road is a low-μ road), the vehicle and traces of driving indicating a slip are displayed in red on the road as identified as "indication 3" in FIG. 13D, and a common triangular warning indication is shown in red to warn the driver more strikingly under the characters reading "grip".

In case that the display 12 is commonly used by a navigation system to display a map on its screen (in a case as shown in FIG. 14A), a pop-up display is shown to warn the driver only when the display flag Fla is 2 (the road is a medium-μ road) and when the display flag Fla is 3 (the road is a low-μ road).

FIG. 14B shows a case in which the display flag Fla is 2 (the road is a medium-μ road). A common triangular indication warning the driver is shown in yellow under characters that read "grip".

FIG. 14C shows a case in which the display flag Fla is 3 (the road is a low-μ road). A common triangular indication warning the driver more strikingly is shown in red under the characters reading "grip".

As described above, in the present embodiment, selection means is constituted by the braking/driving force calculation part 22, the lateral force calculation part 23, and the road surface μ estimation selection part 24; road surface frictional coefficient estimation means is constituted by the first road surface μ estimation part 25 and the second road surface μ estimation part 26; and display means is constituted by the display control part 27 and the display 12.

The display control part 27 not only outputs signals to the display 12 but also outputs the state of a road surface μ to other vehicle behavior control apparatus which are not shown (such as a four-wheel driving controller and an automatic brake controller). A guidance on the state of a road surface μ may be provided by a sound generating apparatus which is not shown in accordance with output from the display control part 27. In this case, for example, an announcement saying "Be careful. The road is slippery" may be issued only when the display flag Fla is 3 (the road is a low-μ road).

The above-described configuration will now be detailed with reference to the flow chart of the road surface frictional coefficient display program shown in FIG. 2. First, required parameters are read at S101.

The process then proceeds to S102 at which the braking/driving force calculation part 22 calculates the braking/driving force Fx. The process then proceeds to S103 at which the lateral force calculation part 23 calculates the lateral force Fy.

The process then proceeds to S104 at which the road surface μ estimation selection part 24 refers to the preset map (FIG. 5) based on the braking/driving force Fx and the lateral force Fy to select the road surface μ estimation part to be used for determination (the first road surface μ estimation part 25 or the second road surface μ estimation part 26 or no determination).

Next, the process proceeds to S105 at which the display control part 27 reads the display flag Fla from the road surface μ estimation part selected at S104 (the display flag Fla is set at 0 when the result of step S104 indicates that no determination will be made) and then proceeds to S106.

At S106, it is determined whether the read display flag Fla is 1 or not (whether the road is a high-μ road or not). If the display flag Fla is 1 (if the road is a high-μ road), the process proceeds to S107 and exits the program after the display 1 (FIG. 13B) is shown.

When the result of determination at S106 indicates that the read display flag Fla is not 1, the process proceeds to S108 at which it is determined whether the read display flag Fla is 2 or not (whether the road is a medium-μ road or not). If the display flag Fla is 2 (if the road is a medium-μ road), the process proceeds to S109 and exits the program after the indication 2 (FIG. 13C or FIG. 14B) is shown.

When the result of determination at S108 indicates that the read display flag Fla is not 2, the process proceeds to S110 at which it is determined whether the read display flag Fla is 3 or not (whether the road is a low-μ road or not). If the display flag Fla is 3 (if the road is a low-μ road), the process proceeds to S111 and exits the program after the indication 3 (FIG. 13D or FIG. 14C) is shown.

When the result of determination at S110 conversely indicates that the read display flag Fla is not 3 (when the read display flag Fla is 0), the process proceeds to S112 and exits the program after the display 0 (FIG. 13AB) is shown.

As described above, according to the present embodiment of the invention, a road surface μ can be accurately estimated because the road surface μ is estimated by selecting the most suitable road surface μ estimation part depending on the state of driving. Indications are shown to the driver depending on the result of estimation of the road surface μ, and such information given to the driver allows the driver to choose to refrain from driving at a high speed, braking or accelerating hard, or turning the steering handle sharply especially during a travel on a road having a low μ, which is very much preferable for stable driving.

While the present embodiment has been described as an example in which two road surface μ estimation parts, i.e., the first road surface μ estimation part 25 and the second road surface μ estimation part 26, another road surface μ estimation part may be provided, and the indication may be varied according to estimated road surface μ values from any of them. Alternatively, only one road surface μ estimation part may be provided, and the indication may be varied according to estimated road surface μ values from the road surface μ estimation part. Further, the technique for estimating a road surface μ at the road surface μ estimation parts is not limited to that described above, and a road surface μ may be estimated using any other method.

What is claimed is:

1. A road surface frictional coefficient estimating apparatus for a vehicle, for estimating a frictional coefficient of a surface of a road on which the vehicle is traveling, comprising:
   a road surface frictional coefficient estimation unit that estimates a frictional coefficient of the road surface based motion parameters of said vehicle; and
   a display that varies a mode of display depending on an estimated road surface frictional coefficient,
   wherein the road surface frictional coefficient estimation unit comprises:
      a front wheel speed detection unit for detecting a speed of front wheels;
      a rear wheel speed detection unit for detecting a speed of rear wheels;
      a vehicle speed detection unit for detecting a speed of the vehicle;
      a vehicle deceleration detection unit for detecting deceleration of the vehicle;
      a steering angle detection unit for detecting a front wheel steering angle;
      a brake status detection unit for detecting the operation of vehicle brakes;
      a front and rear wheels slip ratio difference calculating unit for calculating a difference between slip ratios of the front and rear wheels by dividing a difference between the front wheel speed and the rear wheel speed by the vehicle speed; and
      a road surface μ estimation unit for estimating the current road surface frictional coefficient based on receiving a signal from said steering angle detection unit, the brake status detection unit, and from the relationship between the deceleration of the vehicle and the difference between the front and rear wheel slip ratios,
   wherein the road surface frictional coefficient estimation unit comprises:
      an actual value estimation unit for calculating an actual value of a yaw rate using an observer;
      a high-μ road reference value estimation unit for calculating a reference value of the yaw rate in a predetermined road having a high road surface frictional coefficient, as a high-μ road reference value, using a model of vehicle motion;
      a low-μ road reference value estimation unit for calculating a reference value of a yaw rate in a predetermined road having a low road surface frictional coefficient, as a low-μ road reference value, using the model of vehicle motion;
      a road surface μ relative to yaw rate estimation unit for estimating a second current road surface frictional coefficient by comparing the actual value of the yaw rate with the high-μ road reference value and the low-μ road reference value; and
      a selection unit for selecting one of the current road surface frictional coefficient estimated by the road μ estimation unit and the second current road surface frictional coefficient estimated by the road surface μ relative to yaw rate estimation unit, and
   wherein the display varies the mode of display depending on the road surface frictional coefficient selected by the selection unit.

2. The road surface frictional coefficient estimating apparatus according to claim 1, wherein the display presents different indications depending on the result of estimation by the road surface frictional coefficient estimation unit, the result indicating one of a road having a high road surface frictional coefficient, a road having a medium road surface frictional coefficient, a road having a low road surface frictional coefficient and disabled estimation.

3. The road surface frictional coefficient estimating apparatus according to claim 1, wherein the road surface estimation unit estimates the current road surface frictional coefficient when the steering angle is one of equal to and smaller than a preset value.

4. A road surface frictional coefficient estimating apparatus for a vehicle, for estimating a frictional coefficient of a surface of a road on which the vehicle is traveling, comprising:
  road surface frictional coefficient estimation means that estimates a frictional coefficient of tho road surface based on motion parameters of said vehicle; and
  display means that varies a mode of display depending on the estimated road surface coefficient,
  wherein the road surface frictional coefficient estimation unit comprises:
    a front wheel speed detection unit for detecting a speed of front wheels;
    a rear wheel speed detection unit for detecting a speed of rear wheels;
    a vehicle speed detection unit for detecting a speed of the vehicle;
    a vehicle deceleration detection unit for detecting deceleration of the vehicle;
    a steering angle detection unit for detecting a front wheel steering angle;
    a brake status detection unit for detecting the operation of vehicle brakes;
    a front and rear wheels slip ratio difference calculating unit for calculating a difference between slip ratios of the front and rear wheels by dividing a difference between the front wheel speed and the rear wheel speed by the vehicle speed; and
  a road surface $\mu$ estimation unit for estimating the current road surface frictional coefficient based on receiving a signal from said steering angle detection unit, the brake status detection unit and from the relationship between the deceleration of the vehicle and the difference between the front and rear wheel slip ratios,
  wherein the road surface frictional coefficient estimation means comprises:
    an actual value estimation unit for calculating an actual value of a yaw rate using an observer;
    a high-$\mu$ road reference value estimation unit for calculating a reference value of the yaw rate in a predetermined road having a high road surface frictional coefficient, as a high-$\mu$ road reference value, using a model of vehicle motion;
    a low-$\mu$ road reference value estimation unit for calculating a reference value of a yaw rate in a predetermined road having a low road surface frictional coefficient, as a low-$\mu$ road reference value, using the model of vehicle motion; and
    a road surface $\mu$ relative to yaw rate estimation unit for estimating a second current road surface frictional coefficient by comparing the actual value of the yaw rate with the high-$\mu$ road reference value and the low-$\mu$ road reference value;
    a selection unit for selecting one of the current road surface frictional coefficient estimated by the road $\mu$ estimation unit and the second current road surface frictional coefficient estimated by the road surface $\mu$ relative to yaw rate estimation unit, and
  wherein the display varies the mode of display depending on the road surface frictional coefficient selected by the selection unit.

5. The road surface frictional coefficient estimating apparatus according to claim 4, wherein the display means presents different indications depending on the result of estimation by the road surface frictional coefficient estimation means, the result indicating one of a road having a high road surface frictional coefficient, a road having a medium road surface frictional coefficient, a road having a low road surface frictional coefficient and disabled estimation.

* * * * *